US012349240B2

(12) United States Patent
Ha et al.

(10) Patent No.: US 12,349,240 B2
(45) Date of Patent: Jul. 1, 2025

(54) OVENS FOR ATOMIC CLOCKS AND RELATED METHODS AND ATOMIC CLOCKS

(71) Applicant: Microchip Technology Incorporated, Chandler, AZ (US)

(72) Inventors: Lichung Ha, Wakefield, MA (US); Jay Noble, Beverly, MA (US); David Guan, Belmont, MA (US); Armando T. Martins, Beverly, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 834 days.

(21) Appl. No.: 17/449,854

(22) Filed: Oct. 4, 2021

(65) Prior Publication Data

US 2022/0039209 A1 Feb. 3, 2022

Related U.S. Application Data

(63) Continuation of application No. 16/949,222, filed on Oct. 20, 2020, now Pat. No. 11,166,342.

(60) Provisional application No. 62/706,080, filed on Jul. 30, 2020.

(51) Int. Cl.

*H05B 3/06* (2006.01)
*G04F 5/14* (2006.01)
*H05B 6/36* (2006.01)

(52) U.S. Cl.

CPC ................ *H05B 3/06* (2013.01); *H05B 6/36* (2013.01); *G04F 5/14* (2013.01)

(58) Field of Classification Search

CPC ................ H05B 3/06; H05B 6/36; G04F 5/14
USPC .................................................... 331/94.1, 3
See application file for complete search history.

(56) References Cited

U.S. PATENT DOCUMENTS

| | | | | |
|---|---|---|---|---|
| 2,566,053 | A | 8/1951 | Blakeslee | |
| 3,382,452 | A | 5/1968 | Rempel et al. | |
| 3,667,066 | A | 5/1972 | Kastler et al. | |
| 3,733,511 | A | 5/1973 | Cutler et al. | |
| 4,092,510 | A | 5/1978 | Kiuchi et al. | |
| 5,192,921 | A * | 3/1993 | Chantry | H03L 7/26 331/3 |
| 8,167,784 | B1 | 5/2012 | Honeycutt et al. | |
| 9,201,155 | B2 | 12/2015 | Leblanc et al. | |

(Continued)

FOREIGN PATENT DOCUMENTS

| | | | |
|---|---|---|---|
| CN | 102862275 | A | 1/2013 |
| CN | 103684449 | A | 3/2014 |

(Continued)

OTHER PUBLICATIONS

International Search Report from International Application No. PCT/US2020/070677, mailed Mar. 23, 2021, 4 pages.

(Continued)

*Primary Examiner* — Arnold M Kinkead
(74) *Attorney, Agent, or Firm* — TraskBritt

(57) ABSTRACT

Ovens for atomic clocks may include a body including a cavity within the body. A plurality of heating elements may be distributed around the body, each heating element of the plurality including coils of electrically resistive material. An arrangement of the plurality of heating elements may be such that far fields of magnetic fields having opposite polarities induced by respective coils of the heating elements overlap.

19 Claims, 8 Drawing Sheets

(56) References Cited

U.S. PATENT DOCUMENTS

| | | | | |
|---|---|---|---|---|
| 2014/0070894 | A1 | 3/2014 | Chindo et al. | |
| 2015/0054591 | A1* | 2/2015 | Adachi .................... | H05B 3/26 219/547 |
| 2016/0378065 | A1 | 12/2016 | Rochat et al. | |
| 2018/0181076 | A1 | 6/2018 | Kramer et al. | |

FOREIGN PATENT DOCUMENTS

| | | | |
|---|---|---|---|
| CN | 109676137 | A | 4/2019 |
| WO | 2015/117660 | A1 | 8/2015 |
| WO | 2020/155540 | A1 | 8/2020 |

OTHER PUBLICATIONS

International Written Opinion from International Application No. PCT/US2020/070677, mailed Mar. 23, 2021, 8 pages.

First Office Action and Search Report of Chinese Patent Application No. 202080104592.5, issued Nov. 25, 2024, 16 pages with English translation.

* cited by examiner

OVENS FOR ATOMIC CLOCKS AND RELATED METHODS AND ATOMIC CLOCKS

CROSS-REFERENCE TO RELATED APPLICATION

This application is a continuation of U.S. patent application Ser. No. 16/949,222, filed Oct. 20, 2020, now U.S. Pat. No. 11,116,342, issued Nov. 2, 2021, which claims the benefit under 35 U.S.C. § 119 (e) of the priority date of U.S. Provisional Patent Application Ser. No. 62/706,080, filed Jul. 30, 2020, for OVENS FOR ATOMIC CLOCKS AND RELATED METHODS, the disclosure of each of which is incorporated herein in its entirety by this reference.

FIELD

This disclosure relates generally to ovens for atomic clocks. More specifically, disclosed embodiments relate to ovens for atomic clocks, and methods of making and using such ovens, that may achieve high temperatures while mitigating a net induced magnetic field, particularly the net induced far field, at a resonator of the atomic clock.

BACKGROUND

Atomic clocks generally measure electromagnetic signals emitted or absorbed by electrons of atoms when the energy levels of those electrons/atoms change. To vaporize atoms, and cause them to travel into the relevant inspection region of the atomic clock, an oven may heat a material in a subject cavity. The subject cavity, and other portions of the atomic clock, may be at substantial vacuum to reduce the likelihood that the atmosphere may interact with the material or components of the oven.

BRIEF SUMMARY

In some embodiments, ovens for atomic clocks may include a body including a cavity within the body and a plurality of heating elements distributed around the body. Each of the plurality of heating elements may include a coil of electrically resistive material. An arrangement of the plurality of heating elements may be such that far fields of magnetic fields having opposite polarities induced by respective operating coils of the heating elements overlap.

In some embodiments, methods of making ovens for atomic clocks may involve positioning heating elements around a body including a cavity within the body. The heating elements may include coils of electrically resistive material. Alternate ones of the coils configured to generate magnetic fields having opposite polarities may be positioned to control a magnitude of a magnetic field inducible by the coils.

In some embodiments, methods of using ovens for atomic clocks may involve heating a material within a cavity of a body utilizing heating elements distributed around the body. The heating elements may include coils of electrically resistive material. A magnitude of a magnetic field inducible by the coils of the heating elements may be controlled by generating magnetic fields having opposite polarities utilizing adjacent heating elements.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

Figure 1:
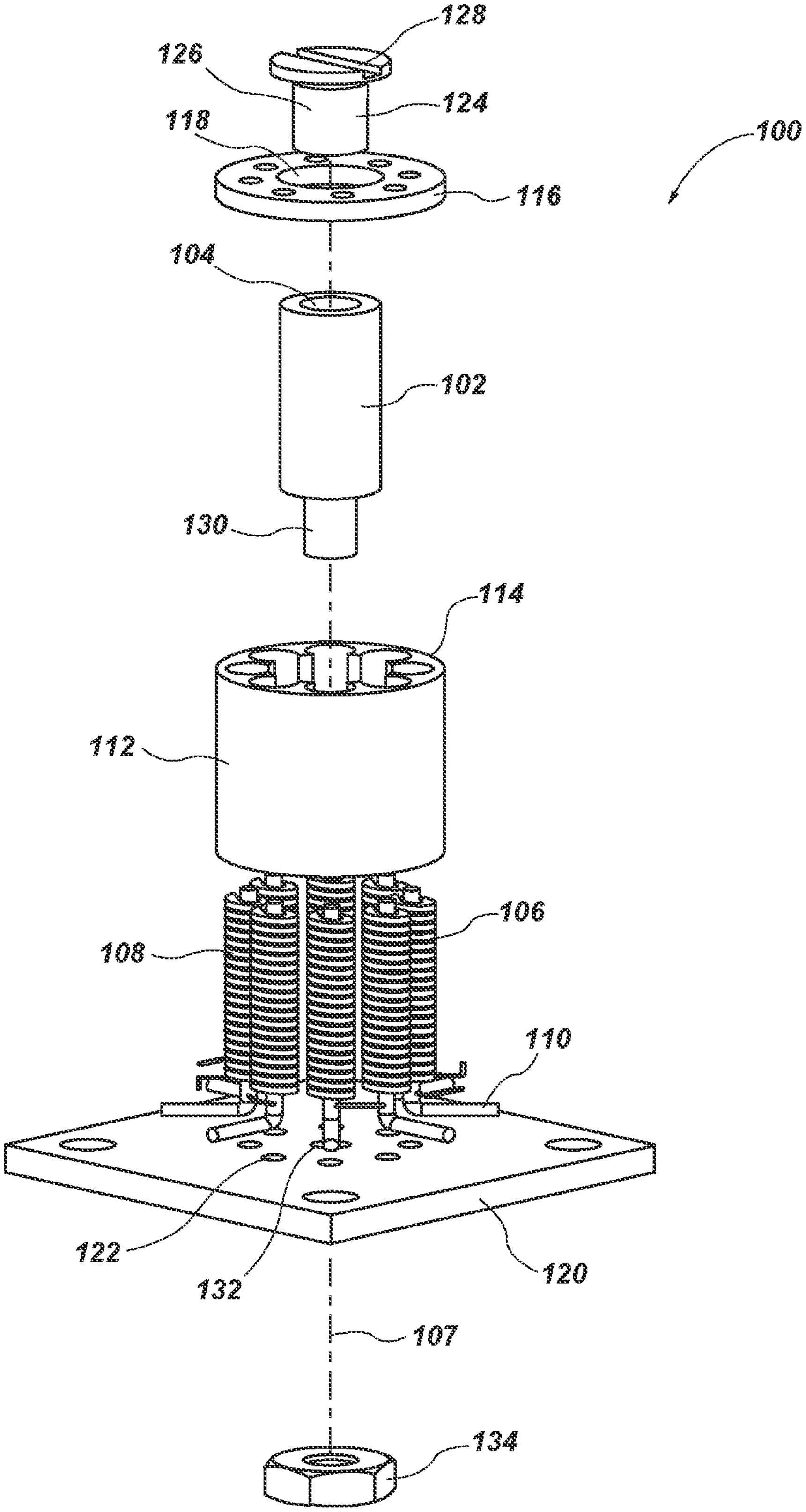
FIG. 1 is an exploded, side perspective view of an oven in accordance with this disclosure.

Disclosed embodiments relate generally to ovens for atomic clocks, and methods of making and using such ovens, that may achieve high temperatures while mitigating undesirable effects of a net induced magnetic field in the proximity of a resonator of the atomic clock—such as frequency shift of the atomic transitions. Stated another way, the sum of the far field effects of the magnetic field of the heaters of the ovens may be negligible or canceled, and so otherwise undesirable fields at the resonator of the atomic clock may be mitigated. For example, heating elements of the oven may be arranged such that far fields of magnetic fields having opposite polarities induced by respective operating coils of the heating elements may overlap. More specifically, disclosed are embodiments of ovens for atomic clocks which may position coils of heating elements in pairs configured to generate magnetic fields having opposite polarities, such that a resulting magnitude of a magnetic field, particularly the far field, at the resonator of an atomic clock is controlled (e.g., mitigated, reduced, substantially eliminated). In some embodiments, a net magnitude of the magnetic field, particularly the far field, induced by the coils at the resonator of the atomic clock may be less than a magnitude of any one of the magnetic fields induced by a respective heating element. In some embodiments, changes in material properties inducible by the far fields of magnetic fields, such as, for example, energy levels of atoms, that may otherwise be induced in one or more components of the associated atomic clock (e.g., in the resonator thereof), or in the subject material itself, may be canceled (i.e., may not be induced) due to the net reduction in the magnitude of the induced magnetic field in the resonator. For example, each heating element may include two coils, an inner coil and an outer coil located concentrically around the inner coil, each of the two coils configured to generate magnetic fields having opposite polarities (e.g., similar poles point in substantially opposite directions). As another example, each heating element may include a single coil, and each heating element may be configured to generate a magnetic field having a polarity opposite a polarity of a magnetic field of each adjacent heating element.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, "each" means some or a totality. As used herein, "each and every" means a totality.

The illustrations presented in this disclosure are not meant to be actual views of any particular oven, circuit, heating element, atomic clock, or component thereof, but are merely idealized representations employed to describe illustrative embodiments. Thus, the drawings are not necessarily to scale.

Figure 2:
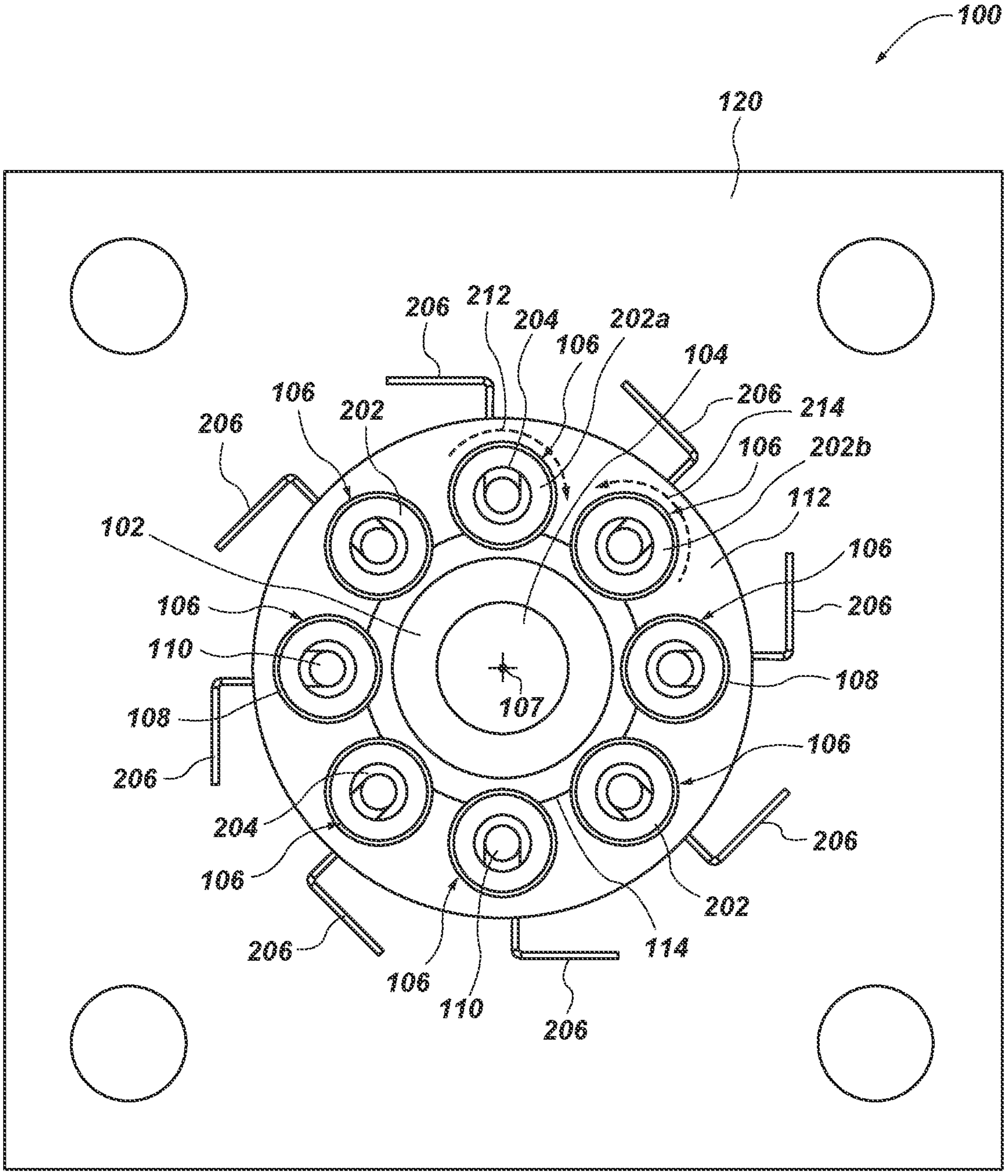
FIG. 2 is a top view of the oven of FIG. 1, with certain exterior components removed so as to be able to see internal components.
Figure 3:
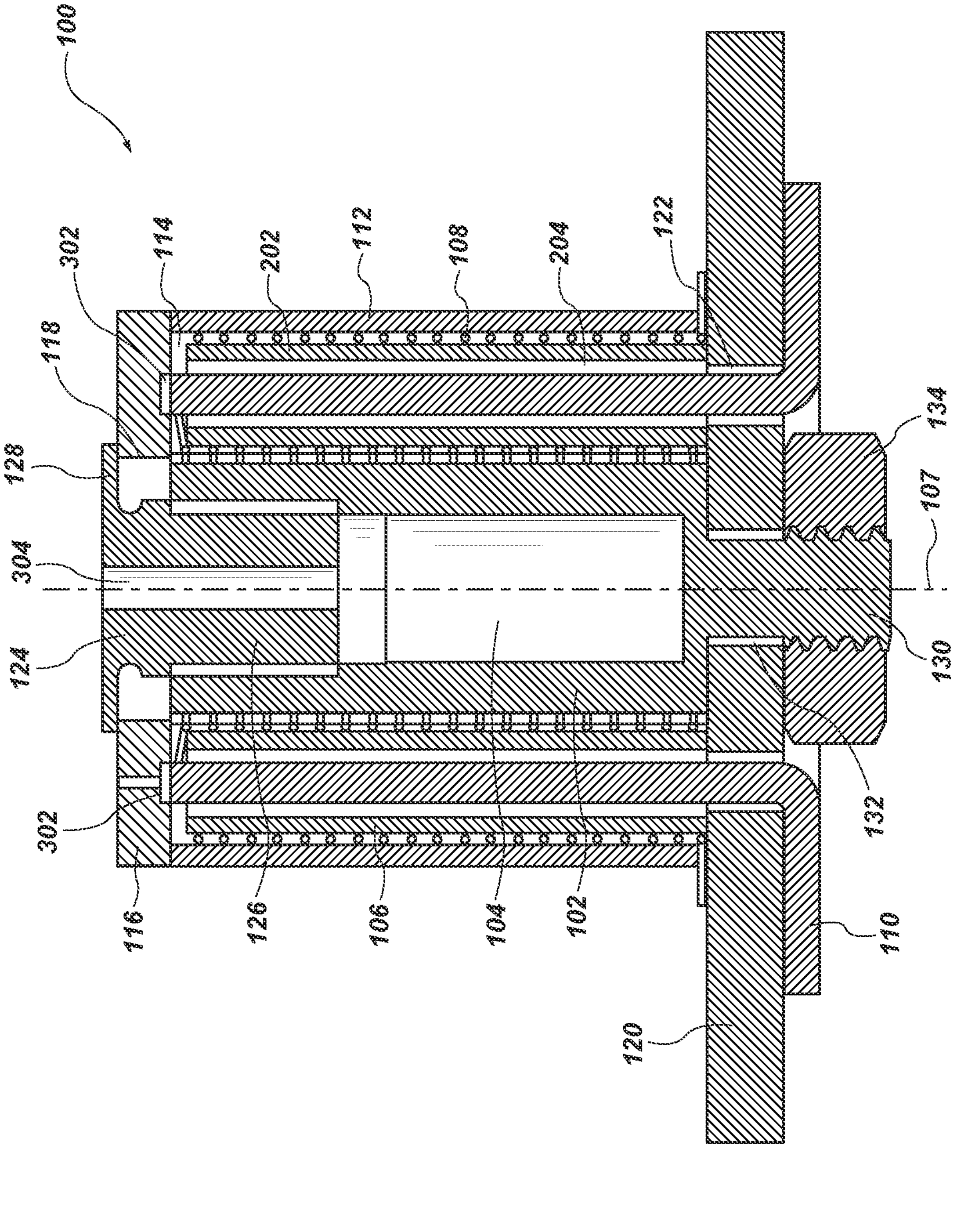
FIG. 3 is a cross-sectional side view of the oven of FIG. 1.

FIG. 1 is an exploded, side perspective view of an oven 100 in accordance with this disclosure. FIG. 2 is a top view of the oven 100 of FIG. 1, with certain exterior components removed so as to be able to see internal components. FIG. 3 is a cross-sectional side view of the oven 100 of FIG. 1. With combined reference to FIG. 1, FIG. 2, and FIG. 3, the oven 100 may include a body 102 sized, shaped, positioned, and configured to receive a subject material (material not depicted) to be heated within the oven 100. For example, the body 102 may define a cavity 104 within the body 102, and material may be positionable in the cavity 104 to heat the material for subsequent use in an atomic clock. The cavity 104 may alternatively be referred to herein as a "chamber." When oven 100 is assembled, heating elements 106 may be distributed around the body 102, and may be positioned and configured to heat material in the cavity 104. The heating elements 106 may generally be configured as resistive heating elements 106, and may include coils 108 of electrically resistive material. The coils 108 may be configured to generate heat responsive to flow of electricity through the coils 108.

The positioning, electrical connection, and operational configuration of the heating elements 106 and coils 108 may cause the coils 108 to generate magnetic fields having opposite polarities in such a way as to control a magnitude of a magnetic field inducible by the coils 108 in locations in and around the oven 100, such as, for example, within a resonator of an atomic clock including the oven 100. More specifically, the heating elements 106 may be arranged such that far fields of magnetic fields having opposite polarities induced by respective operating coils 108 of the heating elements 106 may overlap. As a specific, nonlimiting example, each of the heating elements 106 may be at least substantially similar to one another (e.g., in terms of design, power rating, heat output per unit of time, and/or magnitude), and providing an even number of the heating elements 106, appropriately spaced and positioned, may ensure that for every heating element 106 there is another heating element 106 to generate a far field of a magnetic field of opposite polarity, at least substantially canceling the net effects of the far fields. The heating elements 106 may also be characterized as "cartridge heaters." In the embodiment of FIGS. 1 through 3, for example, includes heating elements 106, each having a single coil 108, distributed around the body 102 in such a way that adjacent heating elements 106 may be configured to generate magnetic fields having opposite polarities from one another. The opposite polarities may at least substantially cancel the effects of the magnetic fields, at least in certain locations, such as, for example, at the far field of the magnetic field near a resonator of an atomic clock. The heating elements 106 are distributed at equal radial distances from a longitudinal axis 107 defined by the body 102, with an equidistant radial separation between each of the heating elements 106.

To facilitate reduction of the net influence of the magnetic fields generated by the heating elements 106, a total number of the heating elements 106 in the oven 100 may be, for example, an even number at least in embodiments where each heating element 106 includes only a single coil 108 or a set of coils 108 all carrying current in the same clockwise direction 212 or counterclockwise direction 214. More specifically, the total number of heating elements 106 in the oven 100 may be between about 6 and about 10 (e.g., about 8), which may ensure that the heating elements 106 as an arrangement and as a group are capable of generating sufficient heat to vaporize the subject material. Having an even number of heating elements 106 may ensure that for each heating element 106 configured to generate a magnetic field of a given polarity, there may be another heating element 106 configured to generate a magnetic field having an opposite polarity, particularly when each heating element 106 only includes a single coil 108 or a set of coils 108 all carrying current in the same clockwise direction 212 or counterclockwise direction 214.

In some embodiments, each heating element 106 may be configured to generate a magnetic field having opposite polarity from each circumferentially adjacent heating element 106. For example, and with particular emphasis on FIG. 2, each of the heating elements 106 located at the 12 o'clock, 3 o'clock, 6 o'clock, and 9 o'clock positions, respectively, may be configured to generate a net induced magnetic field having a first polarity, and those heating elements 106 located between the 1 and 2 o'clock positions, between the 4 and 5 o'clock positions, between the 7 and 8 o'clock positions and between the 10 and 11 o'clock positions, respectively, may be configured to generate a net induced magnetic field having a second, opposite polarity. Placing heating elements 106 configured to generate magnetic fields having opposite polarities adjacent to one another, in an alternating pattern, may facilitate reduction of the combined, experienced magnitude of an induced magnetic field, particularly the induced far field, in the associated atomic clock (e.g., in the resonator thereof).

To enable generation of magnetic fields having opposite polarities, coils 108 of adjacent heating elements 106 may be, for example, configured to carry current in opposite clockwise or counterclockwise directions from one another. For example, and with particular reference to FIG. 2, the coils 108 of each of the heating elements 106 located at the 12 o'clock, 3 o'clock, 6 o'clock, and 9 o'clock positions, respectively, may be configured to carry current in one of a clockwise or counterclockwise direction, and the coils 108 of those heating elements 106 located between the 1 and 2 o'clock positions, between the 4 and 5 o'clock positions, between the 7 and 8 o'clock positions and between the 10 and 11 o'clock positions, respectively, may be configured to carry current in the other of the clockwise direction 212 or counterclockwise direction 214. Placing coils 108 of heating elements 106 configured to carry current in opposite clockwise directions 212 or counterclockwise directions 214 adjacent to one another, in an alternating pattern, may facilitate reduction of the combined, experienced magnitude of an induced magnetic field in regions proximate to, and outside of, the oven 100, particularly when the coils 108 of each heating element 106 are configured to carry current in only one clockwise direction 212 or counterclockwise direction 214. In some embodiments, distinct, complementary pairs of the coils 108 may be formed from a single wire wrapped from the bottom of a first tube 202, such as tube 202*a*, proximate to a base 120 toward the top of the first tube 202 to form a first set of coils 108 of a first heating element 106 and then wrapped from the top of a second, adjacent tube 202, such as tube 202*b*, distal from the base 120 toward the bottom of the second tube 202 to form a second set of coils 108 of a second, adjacent heating element 106.

In some embodiments, each heating element 106 may include a tube 202 (a cross-section of such a tube is depicted by FIG. 2) of electrically insulating material around which the coils 108 of the respective heating element 106 may be positioned. For example, wire may be wound around the tube 202, i.e., about an external surface of the tube 202, to form the coils 108, and the tube 202 may include the electrically insulating material so as not to form undesirable electrical connections among the coils 108. Each heating element 106 may further include, for example, a support 110 of electrically conductive material extending from below the tube 202, through the tube 202, to connect to the coils 108. More specifically, each support 110 may include a wire having a smaller gauge, i.e., a larger diameter, than the wires forming the coils 108, the support 110 may extend through a channel 204 within the tube 202 so as to support the tube 202 and associated coils 108 in a selected position and orientation, and the support 110 may be electrically connected to the wire forming the coils 108 proximate an upper portion of the heating element 106. Ends of the supports 110 located on a side of the base 120 opposite the heating elements 106 may be electrically connectable to a power source 502 (see FIG. 5).

The oven 100 may include a shroud 112 of electrically insulating material at least partially surrounding the coils 108 of each of the heating elements 106. The shroud 112 may also be referred to herein as a "housing." The shroud 112 may be configured to resist transfer of heat generated by the heating elements 106 to the exterior of the oven 100, reduce exposure of components and materials located within the oven 100 to undesirable radiation, and maintain the relative positioning and orientation of certain components, such as, for example, the body 102, the heating elements 106, or both, within the oven 100. For example, when oven 100 is assembled, the shroud 112 may be located radially outward from the body 102, may generally be configured as a sleeve or tube, and may be placed around the heating elements 106 so as to form a radially exterior surface of the oven 100 around the heating elements 106. More specifically, the shroud 112 may define a keyway 114 generally shaped to form a first, large, central, cylindrical void in which the body 102 may be located when the oven 100 is assembled, and a repeating pattern of second, smaller, peripheral, cylindrical voids intersecting with the first void in which the respective heating elements 106 may be located when the oven 100 is assembled. The keyway 114 may have a clearance fit relative to the heating elements 106 so as to enable the shroud 112 to be introduced around the heating elements 106 and the body 102.

Figure 5:
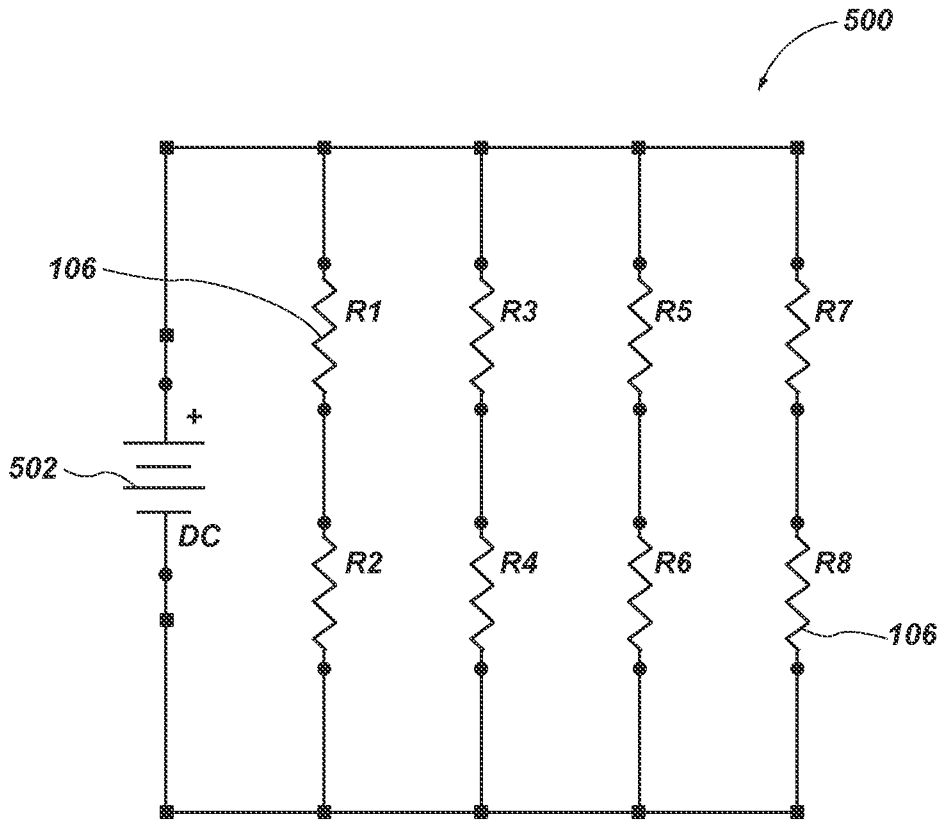
FIG. 5 is a circuit diagram illustrating how heating elements of the oven of FIG. 1 may be electrically connected to one another and to power.

In some embodiments, connection ends 206 of the wires (which may also be referred to as "terminals") forming the coils 108 may extend between the shroud 112 and the base 120 to an exterior of the shroud 112 for connection to a power source 502 (see FIG. 5). For example, the connection end 206 of one heating element 106 may be connected to the positive terminal of the power source 502 (see FIG. 5), and the connection ends 206 of adjacent heating elements 106 to the one highlighted above may be connected to the negative terminal of the power source 502 (see FIG. 5). The coils 108 and the support 110 of a given heating element 106 may be connected at the top of the tube 202, as best seen in FIG. 2, and the wire forming the coils 108 of one heating element 106 may extend continuously to form the coils of a neighboring heating element 106 to form a closed loop. As a result, current flowing through the two heating elements 106 would be the same amount while having the opposite directions. The net effect is to have canceled magnetic fields in the far field. In case of one coil being compromised, current would stop flowing through both coils 108, and the far field magnetic fields would remain canceled. In embodiments where the power source 502 (see FIG. 5) is configured to provide alternating current to the heating elements 106, the adjacent heating elements 106 may be provided alternating current that is out of phase by 180° from one another, which may achieve the same effect.

With reference to FIG. 1 and FIG. 3, in some embodiments, the oven 100 may include a washer 116 of an electrically insulating material overlying the shroud 112. For example, the washer 116 may form a lid for positioning over the keyway 114 of the shroud 112 to at least partially enclose the body 102 and the heating elements 106 within the shroud 112. More specifically, the washer 116 may be shaped as a disc having the same diameter as the outer diameter of shroud 112, and may include an opening 118 to facilitate delivery of subject material to be heated past the washer 116 and into the cavity 104 of the body 102 and movement of excited atoms from the cavity 104 out of the oven 100, and may optionally include one or more divots 302 at an underside of the washer 116, the divots 302 shaped and positioned to receive an uppermost portion of a heating element 106 within a respective divot 302. The oven 100 may also include the base 120 of an electrically insulating material positioned for underlying the shroud 112. For example, lower surfaces of the body 102, tubes 202, and shroud 112 may be in contact with, and supported on, an upper surface of the base 120. The base 120 may include holes 122 extending through a thickness of the base 120, enabling electrical connectors to the heating elements 106, such as the supports 110, to extend through the holes 122 to the heating elements. More specifically, the supports 110 may extend from below the base 120, through respective holes 122, and through respective tubes 202 to connect with associated coils 108 of respective heating elements 106.

A cap 124 may overlie the shroud 112. For example, the cap 124 may include a first portion 126 sized, shaped, and configured to extend through the opening 118 in the washer 116, and a second portion 128 sized, shaped, and configured to contact, and rest on, an upper surface of the washer 116. The first portion 126 of the cap 124 may be securable to the body, such as, for example, utilizing a threaded connection formed in the outer surface of the first portion 126 of the cap 124 and in an inner surface of at least an upper portion of the cavity 104. The cap 124 may clamp the washer 116 and the shroud 112 in place utilizing force generated by the connection between the body 102 and the cap 124, acting through contact between the cap 124 and the washer 116, in a direction oriented from the location of contact between the cap 124 and the washer 116 toward the base 120. The cap 124 may include a nozzle 304 extending through the cap 124. The nozzle 304 may enable evaporated atoms of a subject material to escape from within the cavity 104 and the oven 100 for use in an atomic clock, and retain a remainder of the non-evaporated subject material within the cavity 104.

The body 102 may also be secured to the base 120 in some embodiments. For example, the body 102 may include a protrusion 130 located on an end of the body 102 opposite an opening to the cavity 104, the protrusion 130 extending through anchoring hole 132 defined in the base 120. The body 102 may be secured in place on the base 120 by engaging the protrusion 130 with a connector 134, such as, for example, utilizing a threaded connection, snap fit, friction lock, or the like.

Suitable materials for components of the oven 100, such as, for example, the supports 110 and the coils 108, may generally have a suitably high electrical resistance, a suitably high melting point, corrosion-resistant properties, and exhibit at least substantial stability at designed operating temperatures and pressures. As a specific, nonlimiting example, the materials used for components of the oven 100, such as, for example, the supports 110, the coils 108, body 102 and cap 124, may include tantalum, tungsten, or other elements or alloys. Suitable electrically insulating materials for other components of the oven 100, such as, for example, the tubes 202, shroud 112, washer 116, and base 120 may generally be non-reactive with a selected subject material, have corrosion-resistant properties, and be at least substantially stable at expected operating temperatures and pressures. For example, the insulating materials used for components of the oven 100 may include ceramic materials. In some embodiments, the insulating materials may be sand blasted to clean the components before assembly.

Ovens in accordance with this disclosure, such as the oven 100 of FIG. 1 may enable use of subject materials for atomic clocks requiring higher temperatures to generate suitably excited atoms. For example, the oven 100 may be configured to heat at least a portion of the cavity 104 to a temperature of between about 350° C. and about 450° C., exposing the materials in the cavity 104 to such temperatures. Such temperatures achievable within the cavity 104 may enable use of subject materials requiring high vaporization temperatures.

Figure 4:
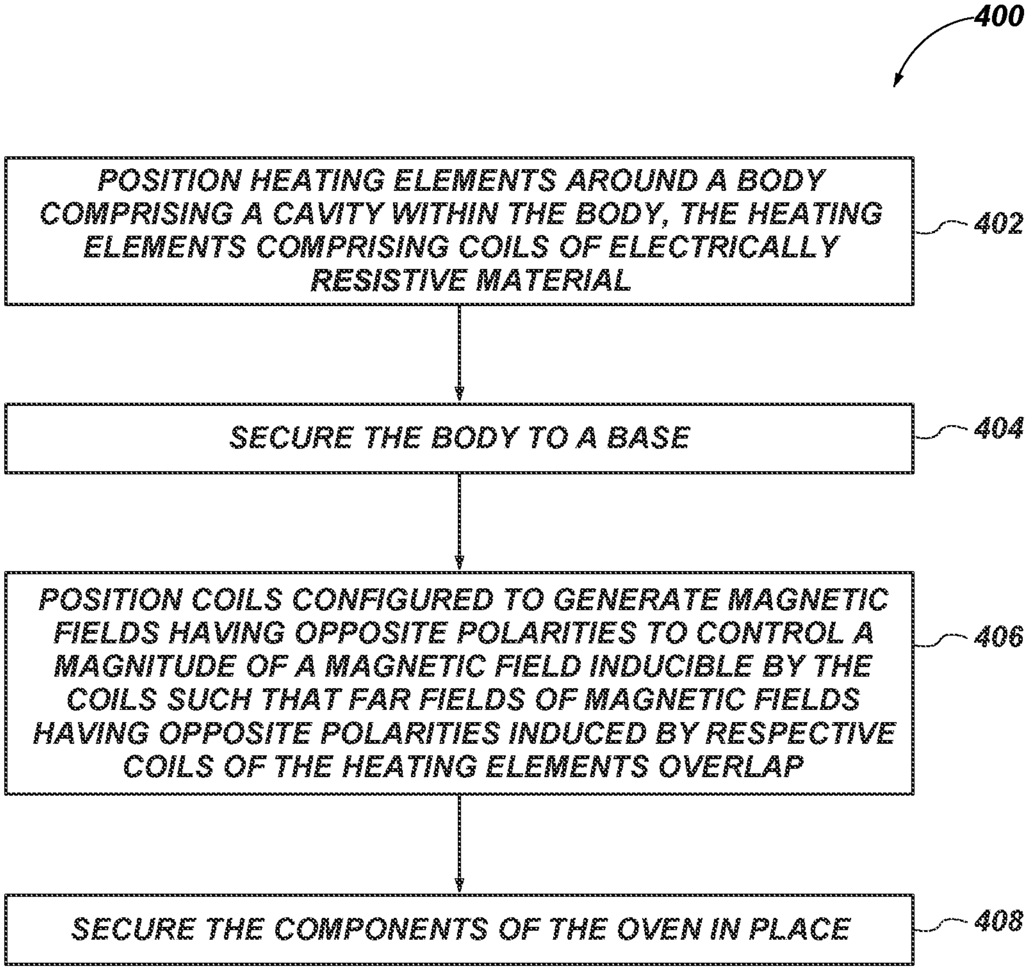
FIG. 4 is a flowchart depicting an illustrative method of assembling the oven of FIG. 1.

FIG. 4 is a flowchart depicting an illustrative method 400 of assembling the oven 100 of FIG. 1. When assembling the oven 100, the body 102 may be placed on the base 120, and the protrusion 130 of the body 102 may be inserted through the anchoring hole 132. The heating element 106 may be put in place around the body 102, as indicated at act 402. The connector 134 may be engaged with the protrusion 130, securing the body 102 to the base 120, as indicated at act 404. The supports 110 may be inserted through the holes 122 in the base 120, and the tubes 202 (see FIG. 2) may be placed around those portions of the supports 110 located on the same side of the base 120 as the body 102. Wires may be wrapped around the tubes 202 to form the coils 108, which may occur before or after placing the tubes 202 around the respective supports 110, and the coils 108 may be electrically connected to the supports 110. The coils 108 may be positioned and configured to generate magnetic fields having opposite polarities to control a magnitude of a magnetic field inducible by the coils 108 such that far field of the magnetic fields having opposite polarities induced by respective coils 108 of the heating elements overlap, particularly in locations proximate to the oven 100, as indicated at act 406. In particular, an even number of tubes 202 are distributed at equal radial distances from a longitudinal axis 107 defined by the body 102, with an equidistant radial separation between each of tubes 202, and adjacent coils 108 wrapped around respective tubes 202 are arranged so as to generate magnetic fields having opposite polarities. The shroud 112 may be placed around the heating elements 106, the washer 116 may be placed in contact with the shroud 112 over the heating elements 106, and the cap 124 may be engaged with the body 102 to secure the components in place, as indicated at act 408.

A subject material may optionally be placed in the cavity 104, and the oven 100 and subject material may be placed in an at least substantial vacuum chamber (e.g., an ultra-high vacuum to the extent practicable for an atomic clock application). Ovens in accordance with this disclosure may enable use of subject materials having higher activation temperatures.

FIG. 5 is a circuit diagram 500 illustrating how heating elements 106 of the oven 100 of FIG. 1 may be electrically connected to one another and to power. For example, the heating elements 106 may generally be grouped in complementary pairs extending around a circumference of the oven 100. For convenience, each heating element 106 shown in FIG. 5 has been labeled in sequence clockwise around the body 102, starting with the topmost heating element 106, i.e., the heating element 106 located at the 12 o'clock position, as depicted in FIG. 2. Each heating element 106 may be electrically connected in series to one of the adjacent heating elements 106 and in parallel to another of the adjacent heating elements 106. For example, the heating element 106 labeled R1 in FIG. 5 is electrically connected in series to the heating element 106 labeled R2, and in parallel to the heating element 106 labeled R8. More specifically, each heating element 106 may be electrically connected in series to one of the heating elements 106 located circumferentially adjacent to that heating element 106, and in parallel to each other heating element 106. As a specific, nonlimiting example, distinct pairs of the heating elements 106 may be electrically connected to one another in series, and each pair of the heating elements 106 may be electrically connected in parallel to each other pair of the heating elements 106. With such a configuration, each of the heating elements 106 may be connected to a power source 502 adequate to power the heating elements 106.

Figure 6:
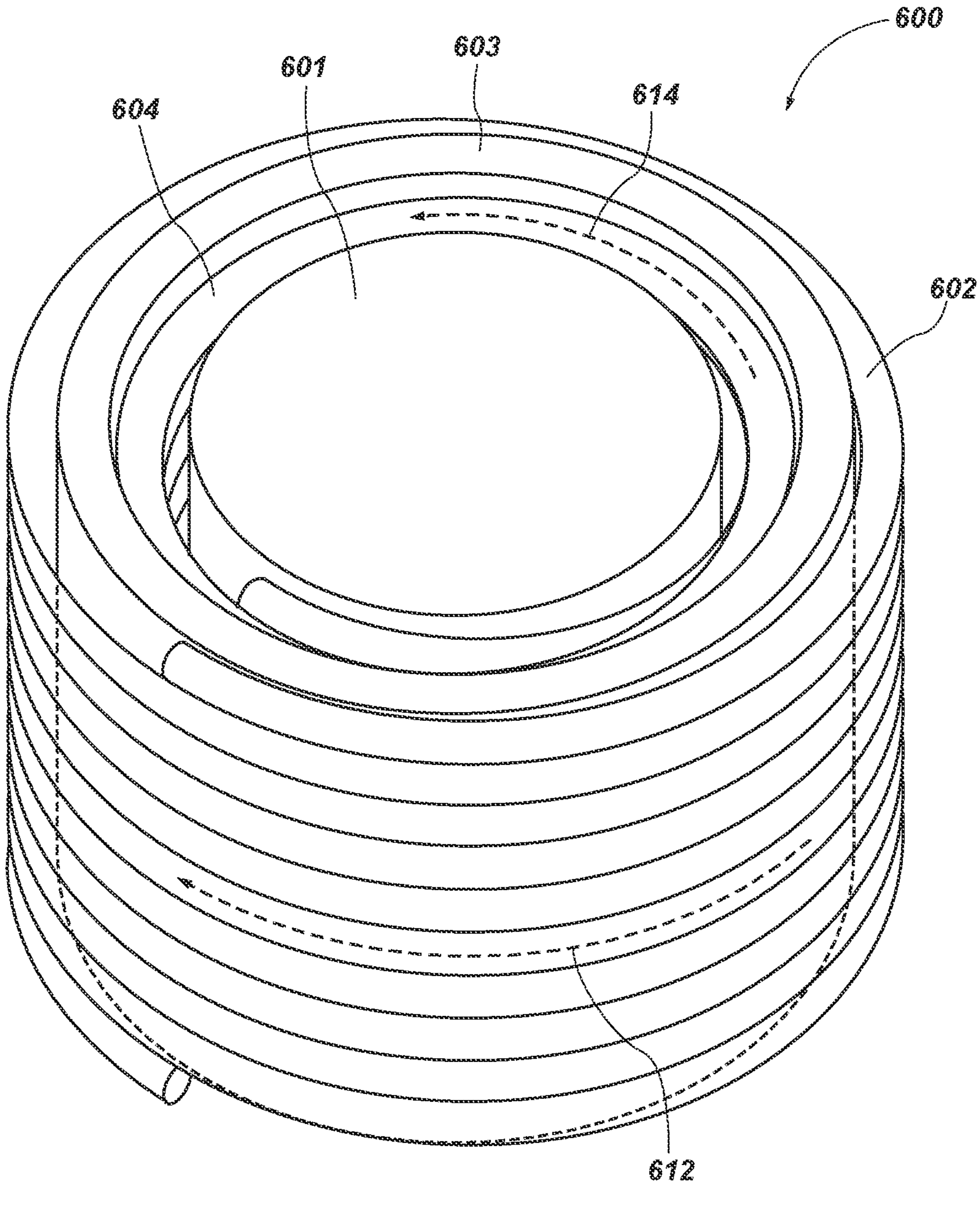
FIG. 6 is a partial cutaway, top perspective view of another embodiment of a heating element usable in ovens in accordance with this disclosure.
Figure 7:
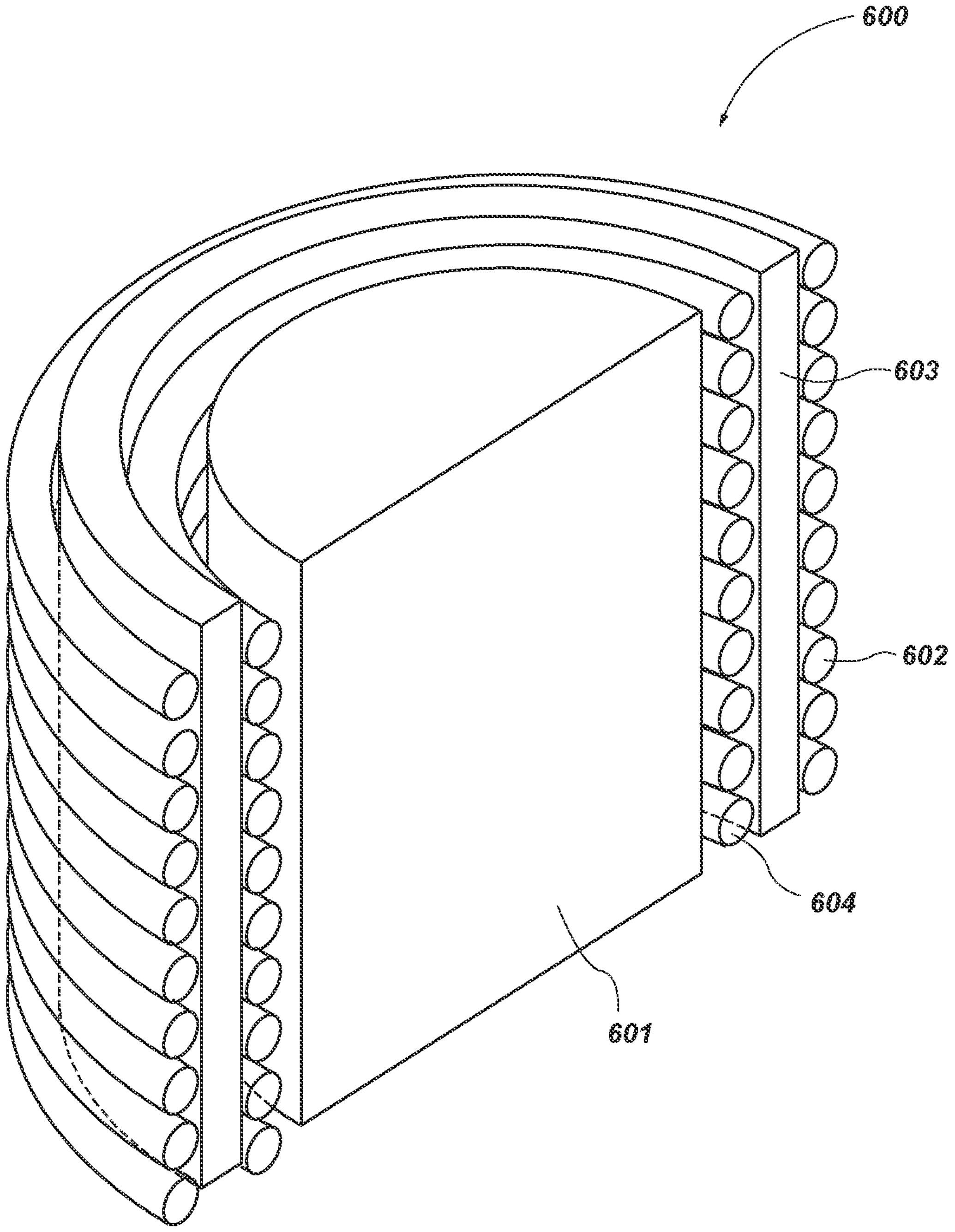
FIG. 7 is a cross-sectional, side perspective view of the heating element of FIG. 6.

FIG. 6 is a partial cutaway, top perspective view of another embodiment of a heating element 600 usable in ovens in accordance with this disclosure. FIG. 7 is a cross-sectional, side perspective view of the heating element 600 of FIG. 6. With combined reference to FIG. 6 and FIG. 7, certain heating elements 600 in accordance with this disclosure may include coils 602 and 604 positioned and configured to at least substantially cancel at least a portion of the magnetic fields generated by the coils 602 and 604, more specifically, the magnetic fields at a resonator of the atomic clock external to the oven 100 (see FIG. 8) is negligible. Such heating elements 600 may not rely on pairings to achieve low detectable magnetic fields, particularly far fields, in regions within the atomic clock and around the oven 100 (see FIGS. 1 through 3), such as, for example, within a resonator. For example, the heating element 600 may include a first coil 602 (or set of coils) of electrically resistive material located around an electrically insulating tube 603, i.e., about an external surface of the electrically insulating tube 603, and a second coil 604 (or set of coils) located within the tube 603. In such an embodiment, the support 601 may be formed from an electrically insulating material, and the support 601 may extend through the second coil 604 (or set of coils). In other words, the second coil 604 (or set of coils) may be interposed between the support 601 and an interior of the tube 603. To enable reduction in the intensity of a detectable magnetic field producible by the heating element 600, the first coil 602 may be configured to carry current in a clockwise direction 612 or counterclockwise direction 614 opposite from a direction in which current is configured to be carried by the second coil 604.

Figure 8:
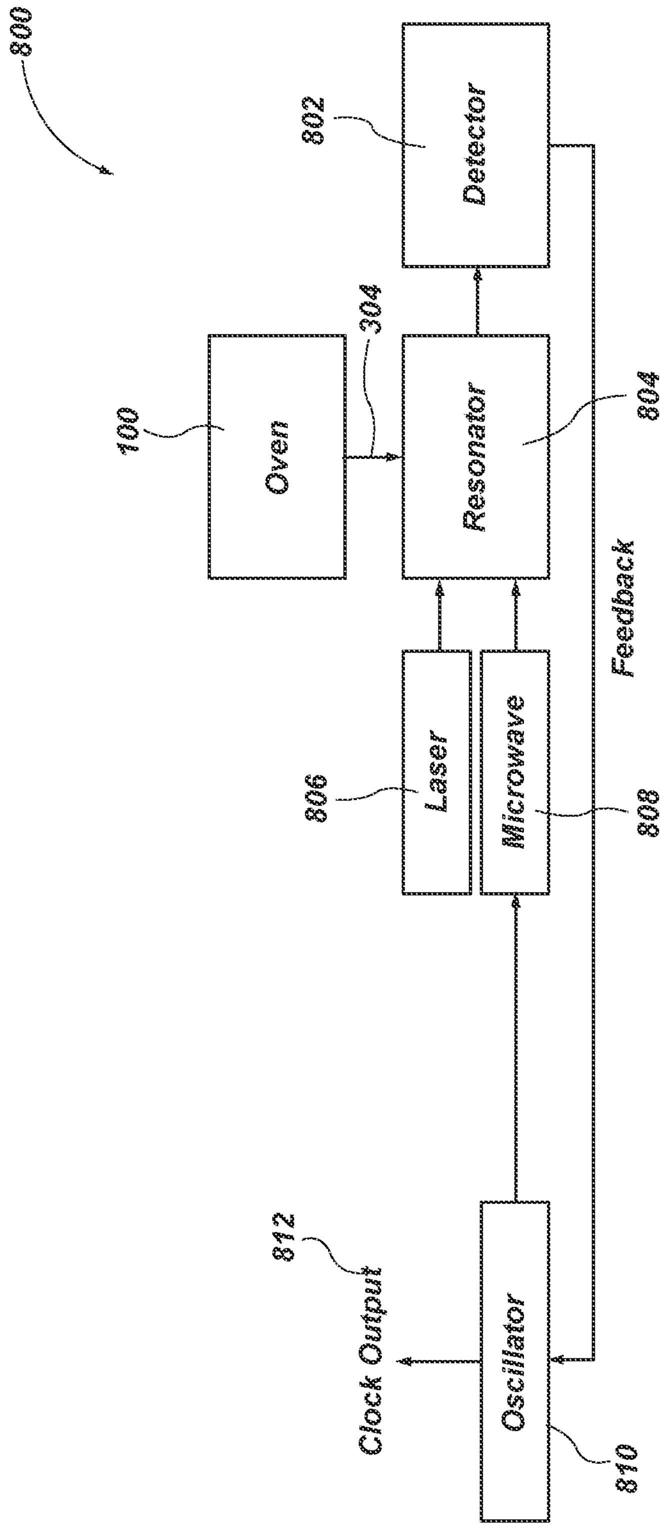
FIG. 8 is a schematic diagram of an illustrative atomic clock.

FIG. 8 is a schematic of an illustrative atomic clock 800 including an oven 100 in accordance with this disclosure. Vaporized atoms of the subject material generated by the oven 100 may exit through the nozzle 304, and be transferred to a resonator 804. The resonator 804 may include an examination region into which the vaporized atoms of the subject material may be directed, and one or more emitters may be configured to direct energy of a known type and intensity toward the examination region (e.g., a laser 806, a microwave 808). A detector 802 may include a sensor configured to detect one or more properties of the vaporized atoms of the subject material in response to the emitted energy. For example, the sensor of the detector 802 may be oriented toward the examination region and be configured to detect the transition of electrons of the subject material between energy levels, responsive to the energy from a first of the emitters (e.g., from the laser 806), as measured in variation of signal strengths relative to the frequency of the microwave 808. One or more signals representative of the properties measured by the detector 802 may be provided as feedback to an oscillator 810. The oscillator 810 may be used to generate a clock output 812, which may be used as a clock signal itself or may be used to verify or synchronize another clock signal. In other words, the oscillator 810 may generate a clock output 812 timed to a frequency corresponding to the rate at which the atoms of the subject material transition between energy levels in response to changes in the frequency from the second emitter (e.g., the microwave 808) as detected by corresponding changes in the energy from the first emitter (e.g., the laser 806). The oscillator 810 may also be used to generate/synthesize microwave 808.

Such an atomic clock 800 may be particularly useful for generating, verifying, or synchronizing clock signals of high accuracy and/or in extreme environmental conditions (e.g., near vacuum, low or micro gravity, near earth orbit and/or space). Atomic clocks 800 in accordance with this disclosure may find application in the aerospace industry (e.g., to control clock signals in satellites and spacecraft), the telecom and banking industries (e.g., to verify or set clock signals for relevant computing systems), and in standard-setting situations (e.g., to establish timings for relevant standards). By reducing the net induced magnetic field generated by the coils 108 or 602 and 604 of the oven 100, particularly the far field at the resonator 804 of the atomic clock 800, the configuration and operation of the oven 100 may reduce the likelihood that any electronic signals received at, or generated by, the resonator 804 may be affected (e.g., distorted) by current induced by the net magnetic field, or changes therein.

Ovens for atomic clocks in accordance with this disclosure may enable use of subject materials having high activation temperatures. Such properties may enable deployment in applications involving long-term, high-reliability use, even in hostile environmental conditions. Reducing the induced magnetic field may reduce the likelihood of clock frequency shift, as well as reducing the likelihood that the induced magnetic field may interfere with other sensitive electronics of the atomic clock, particularly a net induced far field at the resonator of an atomic clock.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure.

What is claimed is:

1. An oven for an atomic clock, comprising:
a body comprising a cavity within the body;
heating elements, each comprising at least one coil, distributed around the body, wherein, for each of the coils configured to produce a magnetic field of a first polarity, the heating elements comprise another coil configured to produce a magnetic field of a second, opposite polarity; and
a shroud of electrically insulating material at least partially surrounding the heating elements, the shroud located radially outward from the body.

2. The oven of claim 1, wherein the heating elements having coils configured to produce the magnetic field of the first polarity alternate with are interleaved with the heating elements having coils configured to produce the magnetic field of the second, opposite polarity, such that a coil configured to produce the magnetic field of the first polarity is between two coils configured to produce the magnetic field of the second, opposite polarity.

3. The oven of claim 1, wherein each of the heating elements comprises two complementary coils, a first coil configured to produce the magnetic field of the first polarity and a second coil to produce the magnetic field of the second, opposite polarity.

4. The oven of claim 1, wherein each of the heating elements comprises a set of coils configured to produce the magnetic field of the first polarity or of the second, opposite polarity.

5. The oven of claim 1, wherein a first coil configured to produce the magnetic field of the first polarity and a second coil configured to produce the magnetic field of the second, opposite polarity are in series.

6. The oven of claim 1, wherein the heating elements comprise an even number of heating elements.

7. The oven of claim 1, wherein coils on opposite sides of the cavity are configured to produce magnetic fields of a same polarity.

8. An oven for an atomic clock, comprising: a body comprising a cavity within the body; and heating elements, each comprising at least one coil, distributed around the body, wherein, for each of the coils configured to produce a magnetic field of a first polarity, the heating elements comprise another coil configured to produce a magnetic field of a second, opposite polarity; wherein adjacent coils are configured to carry alternating current (AC) that is 180° out of phase with each other and a shroud of electrically insulating material at least partially surrounding the heating elements, the shroud located radially outward from the body.

9. The oven of claim 1, wherein the coils are at least substantially equidistant to a center of the cavity.

10. The oven of claim 1, comprising a washer overlying the shroud and a base of an electrically insulating material underlying the shroud, electrical connectors to the heating elements extending through holes in the base to the respective ones of the heating elements.

11. The oven of claim 10, comprising a cap overlying the shroud, the cap being secured to the body, the cap holding the washer and the shroud in place.

12. The oven of claim 11, wherein the cap comprises a nozzle.

13. A method of making an oven for an atomic clock, comprising:

positioning a first coil of a pair of coils a first distance from a center of a cavity in a body, the first coil configured to produce a magnetic field of a first polarity;

positioning a second coil of the pair of coils the first distance from the center of the cavity in the body, the second coil configured to produce a magnetic field of a second, opposite polarity; and at least partially surrounding the first coil and the second coil in a shroud of electrically insulating material, the shroud located radially outward from the body.

14. The method of claim 13, comprising connecting the first and second coil in series.

15. The method of claim 13, comprising placing the first coil and the second coil are angularly adjacent to each other.

16. The method of claim 13, comprising placing an inner coil concentrically within the first coil, the inner coil and first coil configured to produce magnetic fields of opposite polarity.

17. The method of claim 13, further comprising providing an alternating current (AC) to the first coil and second coil, wherein the AC is 180° out of phase between the first coil and the second coil.

18. The method of claim 13, comprising orienting the first coil to carry flow of current in an opposite direction from a direction of flow of current carried by the second coil.

19. An atomic clock, comprising:

a resonator positioned to receive a subject material from an oven, the oven comprising:

a body comprising a cavity within the body;

heating elements, each comprising at least one coil, distributed around the body, wherein, for each of the coils configured to produce a magnetic field of a first polarity, the heating elements comprise another coil configured to produce a magnetic field of a second, opposite polarity; and a shroud of electrically insulating material at least partially surrounding the heating elements, the shroud located radially outward from the body.

* * * * *